Dec. 5, 1967   D. B. PRICE   3,356,344
FOOD MIXER
Filed Aug. 2, 1965

INVENTOR.
David B. Price
BY
ATTORNEY

United States Patent Office 3,356,344
Patented Dec. 5, 1967

3,356,344
FOOD MIXER
David B. Price, Washington, Mansfield, Ohio, assignor to Westinghouse Electric Corporation, Pittsburgh, Pa., a corporation of Pennsylvania
Filed Aug. 2, 1965, Ser. No. 476,528
8 Claims. (Cl. 259—1)

ABSTRACT OF THE DISCLOSURE

Beater ejector mechanism for a food mixer. The mechanism comprises a unitary structure having an apertured arm extending through a wall in the mixer housing and a resilient support inserted through the aperture for securing the unitary structure in an operative position.

---

This invention relates, in general, to food mixers and, more particularly, to ejector mechanism for disconnecting mixer tools from the power unit.

One form of tool, the beater, comprises a shaft, the upper end of which is received in a rotatable spindle journaled in the mixer housing. The beaters must rotate with the spindle at relatively high speeds, therefore, it is necessary to employ means for holding the beaters in their operative position against slight outwardly axial forces, but capable of releasing the beater when the force of the ejector mechanism is applied.

Heretofore, the relative complexity and expense of beater ejector mechanism of prior art food mixing devices has been attributed to a large extent, to the physical location of the ejector actuating button with respect to the actual ejector mechanism and, consequently, to the number of parts utilized. The most common location for the actuating button is at the top of the mixer housing or handle adjacent the motor control button, thereby necessitating the use of linkage interconnecting the actuating button and the ejector mechanism, which is adjacent the bottom of the mixer housing.

Because of the proximity of the ejector actuating button with respect to the motor control button, it is possible to inadvertently eject the beaters at an inopportune time, for example, while the mixer motor is running, consequently, efforts by those in the industry have been directed to providing means for preventing ejection of the beaters at such a time. One such means employs a blocking lever or element moved into the path of movement of the ejector actuating button simultaneously with energization of the motor to thereby render the actuating button inoperable. Needless to say, the added expense of such a feature is not consonant with the policy of cost-reduction brought about by the competitive nature of the industry, and is, therefore, undesirable.

An ejector mechanism may comprise, in the simplest form, a one-piece resilient member which is secured to the underside of the mixer housing intermediate the housing and a shoulder carried by the beater shaft which member is adapted to be displaced in the direction of the beaters to thereby effect disengagement of the spindle and the beater for rendering inoperable the drive relationship therebetween. This type of ejector mechanism is not wholeheartedly accepted by the consumer since he must still physically grasp the beaters to completely remove them.

Accordingly, it is the general object of this invention to provide new and improved beater ejector means for use with a household food mixer.

It is a more particular object of this invention to provide a new and improved ejector mechanism of the type which effects total ejection of the beaters thereby eliminating the necessity of physical contact thereof by the user.

Another object of this invention is to provide simple and inexpensive means in a househld food mixer for effecting, semi-automatically, the ejection of the beaters thereof.

Briefly, the above-cited objects are accomplished by providing a substantially Y-shaped lever having an aperture in one leg thereof. The apertured leg fits through an opening in the bottom wall of the mixer housing and is held therein by means of a spring, which spring also serves to bias the Y-shaped lever in a clockwise direction. One end of another leg of the Y-shaped member, in the inoperative or normal position, is substantially parallel to and is disposed intermediate the bottom wall of the mixer housing and shoulders carried by the upper portions of the beater shafts. Still another end or leg of the Y-shaped member, by which the ejector mechanism is actuated, is angulated with respect to the mixer housing to allow movement thereof toward the bottom wall of the housing or in other words to enable counterclockwise pivoting of the Y-shaped member in opposition to the biasing force of the spring, the leg disposed intermediate the bottom wall and shoulders being effective upon counterclockwise movement of the Y-shaped member to eject the beaters from the mixer.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
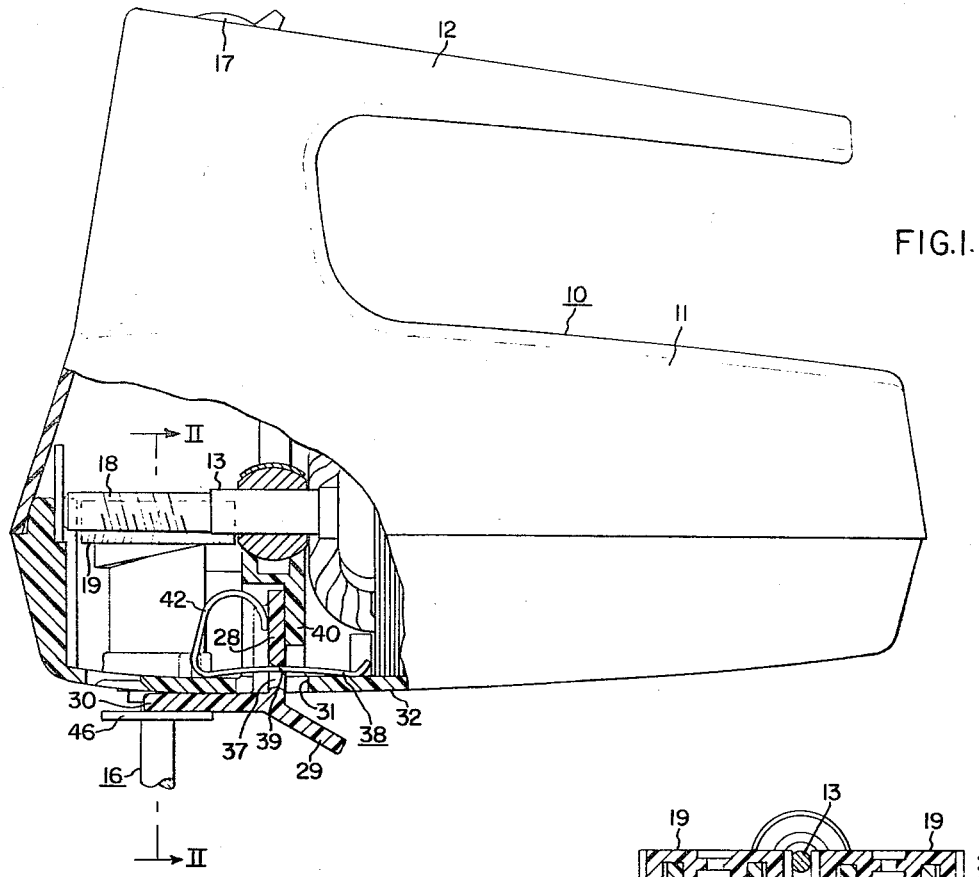
FIGURE 1 is a side elevational view, partly broken away, of a food mixer incorporating the invention.
Figure 2:
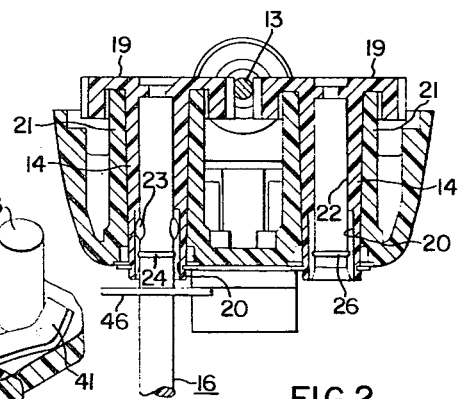
FIG. 2 is a cross-sectional view taken on the line II—II of FIG. 1.

Referring to the drawings, especially FIG. 1, reference character 10 designates generally a food mixer comprising a two-piece housing 11 having a handle 12 formed integrally with the top member of the two-piece housing 11. The bottom member of the housing 11 supports a drive shaft 13 for a pair of hollow spindles 14 (FIG. 2), only one being shown, adapted to telescopically receive for rotation therewith, the shafts of a pair of beaters, only portions of which are shown at 16. The shaft 13 is driven by a suitable motor, not shown, but contained in the lower member of the housing 11, which motor is adapted to be energized by means of a multi-position, manually operable switch 17. A worm or worm gear 18 formed in the shaft 13 meshes with worm wheels 19 fixed to the upper ends of the spindles 14 which are supported for rotation by vertically disposed sleeve bearings 21.

The shafts of the beaters 16 may be coupled to the spindles 14 in any suitable manner, for example, as shown, the shafts extend into axial bores 22 (see FIG. 2) formed in the spindles 14 and are provided with a pair of radially extending opposed bosses or keys 23. These bosses are received in opposed slots 20 provided in the annular wall defining the bore 22. Each beater 16 is retained in one of the bores 22 through seating of a conventional spring C ring 24, suitably disposed in an annular groove formed in the shaft of the beater 16 slightly below the boss 23, within an annular groove 26 in the lower end of the wall defining the bore 22. In assembling the beater 16 to the spindle 14, the shaft thereof is inserted in the bore 22 until the spring C ring 24 seats within the annular groove 26.

Figure 3:
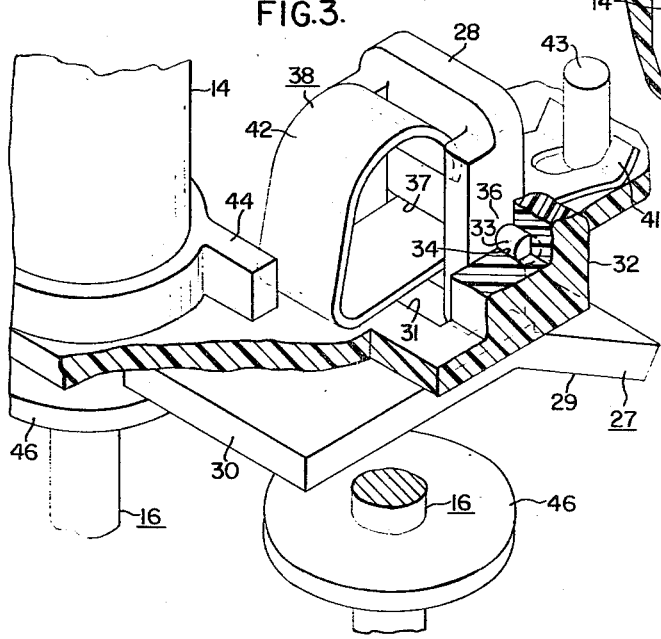
FIG. 3 is a fragmentary perspective view of a beater ejector mechanism and food mixer housing representing the invention.

Ejecting mechanism 27, best illustrated in FIG. 3, comprises a one-piece lever member preferably molded from any suitable material, for example, nylon. The lever member 27 has a generally Y-shaped configuration consisting of three legs or radially extending arms 28, 29 and 30. The leg 28 is adapted to be inserted through an opening 31 in a bottom wall 32 of the housing 11 and a pair of trunnions 33 projecting outwardly from the sides of the leg 28 are insertable in opposed grooves 34, formed in the side walls of the bottom member of the housing 11. Cooperation between the walls of the grooves 34 and the trunnions 33 serve to properly position the leg 28 within the housing 11 while abutment of the trunnions 33 against shoulders 36 at the top of the grooves 34 serve to limit insertion or penetration of the leg 28 into the housing 11. The leg 28 is provided with an aperture 37 for receiving resilient means, herein disclosed as a spring 38.

The spring 38 comprises a substantially horizontal but slightly bowed portion, 29 bifurcated at one end as indicated at 41 and a substantially vertical hook-shaped portion 42. The free end of the hook-shaped portion 42 biases the leg 28 in a clockwise direction, as viewed in FIG. 1, to oppose counterclockwise movement of the leg 29 which lies outside of the housing 11 and which in its inoperative position (as shown) forms an acute angle with respect to the bottom wall 32. Biasing of the leg 28 in the clockwise direction is limited by the abutment thereof against a partition 40 (see FIG. 1) extending between the side walls of the bottom member of the housing 11. The spring 38 serves to fix the vertical position of the lever member 27 in the opening 31 and the horizontal movement thereof is restrained through abutment of the bifurcated end 41 against a vertical post 43 and the hook-shaped portion 42 against a pair of vertical shoulders 44 (only one shown). To assemble the lever 27 and spring 38, the leg 28 of the spring is inserted through the opening 31, then the bifurcated end of the spring is inserted through the aperture 37 and snapped into place between the post 43 and shoulders 44 and lies across the opening 31. The leg 30 of the lever 27 is substantially parallel to and is disposed intermediate the bottom wall 32 and shoulders 46 formed integrally or otherwise provided in the upper portion of the shaft of the beaters 16 subadjacent the spring C rings 23. Since the leg 30 is integral with the leg 29, it moves in a counterclockwise direction upon depression toward the bottom wall 32 or actuation of the leg 29 to simultaneously contact the shoulders 46 thereby applying sufficient force to completely eject the beaters 16 from the spindles 14. Upon release of the leg 29 the hook-shaped portion 42 of the spring 38 returns the lever 27 to its rest or normal position. The leg 29 may be thought of as an actuating button which pivots about a horizontal axis through the line of contact between the shoulders 36 and the trunnions 33. While the leg 29, as disclosed, simultaneously contacts both of the shoulders 46, it may be provided with a stepped area in its underside whereby the shoulders 46 are sequentially contacted thereby reducing the peak force required for ejection of the beaters.

While there has been shown and described what is at present considered to be the preferred embodiment of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. In a portable food mixer having a housing, a pair of beaters each including a shaft having a shoulder thereon, the shaft being insertable in a spindle in the housing and means releasably securing the shafts in said spindles for rotation therewith, the improvement comprising: a multi-armed beater ejecting mechanism, one of said arms being insertable through an opening in the housing and provided with an aperture therein, spring support means inserted through said aperture, means for positioning said spring support means across said opening, another of said arms being disposed in a position to contact the shoulders carried by said shafts upon actuation of said mechanism to apply axial force thereto for ejecting said beaters, said spring support means having a portion thereof abutting said one arm for biasing thereof in a direction opposing the direction of travel of said mechanism.

2. Structure as specified in claim 1, wherein said another of said arms lies outside of the housing intermediate said shoulders and said housing.

3. Structure as specified in claim 1, wherein still another of said arms serves as an actuating button extending outside of the housing and angulated with respect thereto.

4. Structure as specified in claim 1, including trunnion receiving grooves formed in opposed walls of said housing, said one of said arms having a pair of trunnions received in said grooves and biased therein by said spring support.

5. In a food mixer comprising a housing, a pair of beaters each including a shaft provided with a shoulder, the shafts being insertable in spindles rotatably supported in the housing, the improvement comprising: beater ejector mechanism including a first arm insertable through an opening in said housing and having an aperture therethrough, resilient support means inserted through said aperture and simultaneously engaging opposed surfaces of said housing delineating said opening, means in said housing for maintaining said support means in a fixed position relative to said opening such that said first arm is captivated within said housing, said mechanism comprising a second arm disposed in a position to contact said shoulders upon actuation of said mechanism whereby axial force is applied thereto for ejecting the beaters.

6. Structure as specified in claim 5, wherein a portion of said resilient support means abuts said first arm for biasing thereof in a direction opposing the direction of travel of said lever during an ejecting operation.

7. Structure as specified in claim 6, including a third arm serving as an actuating button extending outside of the housing and angulated relative thereto.

8. Structure as specified in claim 5, wherein said second arm extends outside said housing intermediate thereof and said shoulders.

References Cited

UNITED STATES PATENTS

| | | | |
|---|---|---|---|
| 2,773,679 | 12/1956 | Miller | 259—1 |
| 2,797,901 | 7/1957 | Seyfried | 259—1 |
| 2,798,696 | 7/1957 | Kuhagen et al. | 259—1 |
| 3,271,013 | 9/1966 | Chambers et al. | 259—1 X |

FOREIGN PATENTS

| | | |
|---|---|---|
| 1,261,027 | 4/1961 | France. |
| 628,480 | 11/1961 | Italy. |

WALTER A. SCHEEL, *Primary Examiner.*

J. M. BELL, *Assistant Examiner.*